United States Patent [19]

Kazakevich

[11] Patent Number: 5,864,359
[45] Date of Patent: Jan. 26, 1999

[54] STEREOSCOPIC AUTOFOCUSING BASED ON COMPARING THE LEFT AND RIGHT EYE IMAGES

[75] Inventor: Yuri E. Kazakevich, Methuen, Mass.

[73] Assignee: Smith & Nephew, Inc., Memphis, Tenn.

[21] Appl. No.: 446,048

[22] Filed: May 30, 1995

[51] Int. Cl.[6] .............................. H04N 13/02; A61B 1/04
[52] U.S. Cl. .............................. 348/45; 348/46; 600/111; 600/166
[58] Field of Search .................................. 348/42, 45, 46, 348/49; 359/462, 464, 473, 476; 600/111, 163, 166; H04N 13/02, 7/18

[56] References Cited

U.S. PATENT DOCUMENTS

| | | | |
|---|---|---|---|
| 3,251,933 | 5/1966 | Beste | 348/49 |
| 3,818,125 | 6/1974 | Butterfield | 348/49 |
| 4,393,400 | 7/1983 | Ikushima et al. | 348/56 |
| 4,414,575 | 11/1983 | Yamamoto et al. | 348/350 |
| 4,523,226 | 6/1985 | Lipton et al. | 348/49 |
| 4,562,463 | 12/1985 | Lipton | 348/56 |
| 4,601,053 | 7/1986 | Grumet | 382/106 |
| 4,668,991 | 5/1987 | Theuwissen et al. | 348/349 |
| 4,873,572 | 10/1989 | Miyazaki et al. | 348/45 |
| 4,895,431 | 1/1990 | Tsujiuchi et al. | 348/45 |
| 4,969,735 | 11/1990 | Gilligan | 348/42 |
| 5,105,278 | 4/1992 | Takemoto | 348/356 |
| 5,121,152 | 6/1992 | Wagner | 348/345 |
| 5,142,642 | 8/1992 | Sudo | 348/47 |
| 5,193,000 | 3/1993 | Lipton et al. | 348/43 |
| 5,220,441 | 6/1993 | Gerstenberger | 348/42 |
| 5,237,167 | 8/1993 | Hibbard | 396/111 |
| 5,266,791 | 11/1993 | Morizumi | 250/201.3 |
| 5,546,120 | 8/1996 | Miller et al. | 348/59 |
| 5,577,991 | 11/1996 | Akui et al. | 600/111 |

FOREIGN PATENT DOCUMENTS

| | | |
|---|---|---|
| 268 533 A1 | 5/1989 | Germany . |
| 269 235 A1 | 6/1989 | Germany . |
| 63-98285 | 10/1986 | Japan ............................. H04N 5/232 |
| 873458 | 5/1979 | Russian Federation ......... H04N 5/26 |

OTHER PUBLICATIONS

IBM Technical Disclosure Bulletin, "Generating a 3D–TV Signal with One TV Camera", 8:134 (1), 1965, Jun.
Carellas, P., Taking the Blur Out of Autofocus Camera Mechanisms, Everyday Optics, Optics & Photonics News pp. 6–7, 1993, Sep.
Goldberg, "Camera Technology", 1993, pp. 20–21.
Canonet G–III 17, www.canon.co.jp/camera–museum/third2/f3–2 netg3–17.html, Jun., 3, 1998.
Canon A35F, www.canon.co.jp/camera–museum/third2/f3–2–a35f.html, Jun. 3, 1998.
Pacific Rim Camera: Glossary of Terms; www.teleport.com/~pacrim/gloss/glossary.htm, Jun. 3, 1998.

*Primary Examiner*—Bryan Tung
*Attorney, Agent, or Firm*—Fish & Richardson P.C.

[57] ABSTRACT

A stereoscopic image of an object is focused on an image pickup device based on the degree to which left and right images of the object are coincident on the image pickup device. Signals produced by the image pickup device that represent the left and right images are compared with each other to develop a control signal that indicates the coincidence of the left and right images on the image pickup device, and the spacing between the image pickup device and an optical element that directs the images onto the device is changed in response to the control signal to increase the coincidence. Two alternative types of comparison are performed, each of which indicates the degree of coincidence (and hence the quality of focus) of the left and right images on the image detector. In one approach, the left and right images are compared to determine their cross correlation on the image pickup device, and the spacing is changed to maximize the correlation. Alternatively, the comparison determines the difference between the left and right images on the image pickup device, and the spacing is changed to minimize the difference. The focusing technique is useful in, e.g., the optical system of an endoscope. Rangefinding and videometry are also performed to determine the distance to the object being viewed, as well as its position and size.

42 Claims, 6 Drawing Sheets

STEREOSCOPIC AUTOFOCUSING BASED ON COMPARING THE LEFT AND RIGHT EYE IMAGES

BACKGROUND OF THE INVENTION

This invention relates to focusing a stereoscopic optical system. The invention also relates to rangefinding and videometry in an imaging system.

Stereoscopic optical systems are used in a variety of applications. One environment in which stereoscopic (i.e., three-dimensional) viewing has become useful is the field of endoscopic surgery. During this type of surgery, an endoscope is inserted into the body through a small puncture opening to allow the user to visualize the surgical site without fully opening the wound. The endoscope supplies light to the surgical site through a set of optical fibers that extend along the length of the endoscope. An image pickup device (such as a solid-state sensor, e.g., a charge-coupled device or CCD) receives optical images of objects in the surgical site from an optical assembly, and converts the images to electrical signals for visualization on an electronic display. The image pickup device can be located at the distal tip of the endoscope, in the proximal, handle end of the endoscope, or anywhere in between.

Stereoscopic optical systems produce a video image of an object by acquiring separate left and right images of the object from two different viewing angles. The systems display the right image to the observer's right eye, and separately display the left image to the observer's left eye to provide a three-dimensional view of the object.

SUMMARY OF THE INVENTION

This invention features automatically focusing a stereoscopic optical system based on the degree to which the left and right images are coincident on an image pickup device. The invention is particularly, but by no means exclusively, useful in a stereoscopic optical system of an endoscope.

In one general aspect of the invention, an optical assembly applies left and right images of the object to the image pickup device. In response, the image pickup device produces signals that represent the left and right images. A processor compares the signals with each other to determine the degree of coincidence of the left and right images on the image pickup device, and the spacing between the optical assembly and the image pickup device is changed to increase the coincidence.

Preferred embodiments include the following features.

Two alternative types of comparison are performed. Each indicates the degree of coincidence—and hence the quality of focus—of the left and right images on the image pickup device.

In one approach, the correlation between the left image and the right image on the image pickup device is determined based on the signals generated by the image pickup device. The spacing between the optical assembly and the image pickup device is changed so as to maximize the correlation.

The cross correlation metric $K(\tilde{s}')$ between a normalized intensity distribution $u(x,y,\tilde{s}')$ of the left image on the surface of the image pickup device, and a normalized intensity distribution $v(x,y,\tilde{s}')$ of the right image on the surface is given by:

$$K(\tilde{s}')=\int_A \int u(x,y,\tilde{s}')v(x,y,\tilde{s}')dxdy$$

X and y are the Cartesian coordinates of the surface (the origin being located on an optical axis of the optical assembly), A is the region on the image pickup device over which the integration is performed, and $\tilde{s}'$ is a parameter defining the distance between the optical assembly and the image pickup device along the optical axis. The distance $\tilde{s}'$ is measured from the second principal plane (the plane from which the focal length of the optical assembly is measured) to the surface of the image pickup device.

According to another comparison technique, the absolute value of the difference in intensity between the left image and the right image on the surface of the image pickup device is found, and the spacing between the optical assembly and the image pickup device is changed to minimize the intensity difference. The difference metric, $D(\tilde{s}')$ is given by:

$$D(\tilde{s}')=\int_A \int |u(x,y,\tilde{s}')-v(x,y,\tilde{s}')|dxdy$$

In both techniques, the comparison is performed between portions of the left and right images that are received on a selected region of the surface of the image pickup device. The region is defined by the shape and area of A. Typically, a central rectangular region is chosen by selecting symmetrical limits, such as (−a, a) and (−b, b). This provides optimal focusing on the objects located in the central region of the field of view of the system.

The spacing between the optical assembly and the image pickup device is changed by moving the optical assembly, the image pickup device, or both.

The optical assembly includes left and right apertures for respectively defining the left and right optical paths forming the left and right images on the surface of the image pickup device. In one embodiment, the left and right images are applied in different time intervals to a common element of the image pickup device (e.g., a single solid state sensor, such as a charge-coupled-device, or CCD). A plurality of shutters are alternately opened and closed by a modulator to sequentially apply the left and right images to the common element of the image pickup device. The comparison procedure is timed so that the signals compared to each other represent the left and right images successively applied to the common element of the image pickup device.

The invention focuses the stereoscopic image automatically and transparently to the user. The invention thus eliminates the need for the user to manually focus (or refocus) the image on the image pickup device. This is particularly advantageous in applications in which the focus of the stereoscopic optical system changes rapidly or often (such as in endoscopic viewing applications).

Determining $K(\tilde{s}')$ and $D(\tilde{s}')$ is straightforward, and thus the focusing can be performed in real-time. $K(\tilde{s}')$ and $D(\tilde{s}')$ are determined preferably over only a small portion of the image plane, thus further increasing focussing speed.

In another general aspect of the invention, the stereoscopic system performs rangefinding. That is, the system determines the distance between the optical assembly and a selected object along the optical axis of the system. With the image in-focus, a sensor located on the image pickup device determines the distance from the image pickup device to the second principal plane of the optical assembly (i.e., the image distance). The processor then finds the distance from the optical assembly to the object, using the focal length of the optical assembly and the image distance. The rangefinding feature is applicable to both stereoscopic and two-dimensional imaging systems.

Preferred embodiments include the following features. The processor determines the distance from the object to the first principal plane of the optical assembly according to the relationship:

$$s = \frac{s'f}{f - s'}$$

where s' is the image distance and f is the focal length.

In some embodiments, rangefinding is performed only when the distance between the optical assembly and the object falls within an acceptable range. After rangefinding is performed on a second object to find the distance between the second object and the optical assembly, the processor finds the distance between the two objects along the optical axis by determining the difference between the distances to the objects.

In yet another aspect of the invention, the stereoscopic system also performs videometry; that is, the system locates a position of the object in a plane transverse to the optical axis. After focusing, the processor determines the position of the image of the object on the surface of the image pickup device. The processor then locates the position of the object in the plane based on the position of the image, the focal length of the optical assembly, and the distance between the optical assembly and the object. The videometry feature is applicable to both stereoscopic and two-dimensional imaging systems.

The processor finds the position of the object in the plane transverse to the optical axis by performing the operation:

$$R = r/m$$

where $$R = \sqrt{X^2 + Y^2} \quad ; r = \sqrt{x^2 + y^2} \quad ; m = \frac{f}{s + f}$$

where X and Y are the coordinates of the object in the plane (the optical axis of the image pickup device defines the origin of the X-Y coordinate system), R is the polar radius of the object in the object plane, and r is the polar radius of the image on the surface of the image pickup device.

In some embodiments, the processor corrects for distortion of the image. For example, the processor finds a distortion factor characteristic of the optical assembly, and then determines R by performing the operation:

$$R = \frac{r}{m(D_r + 1)}$$

where $D_r$ is the distortion factor. In other embodiments, the processor calculates an area of the object that is projected on the plane.

Rangefinding and videometry are performed together to completely specify a position of the object in three-dimensional space. After the coordinates of a second object are found in this way, the processor finds the true distance between the two objects, i.e., the length of a vector connecting the two objects.

In still other embodiments, both the rangefinding and videometry features are incorporated into a stereoscopic system for use in an endoscope.

The rangefinding and videometry functions allow the stereoscopic system to quickly locate both the size and position of any object in the system's field of view.

The autofocusing, rangefinding and videometry techniques are easily implemented in a variety of stereoscopic instruments, including three-dimensional stereoendoscopes and couplers, stereocamcorders and stereo still cameras.

Other features and advantages of the invention will become apparent from the following description and from the claims.

DESCRIPTION OF PREFERRED EMBODIMENTS

Figure 1:
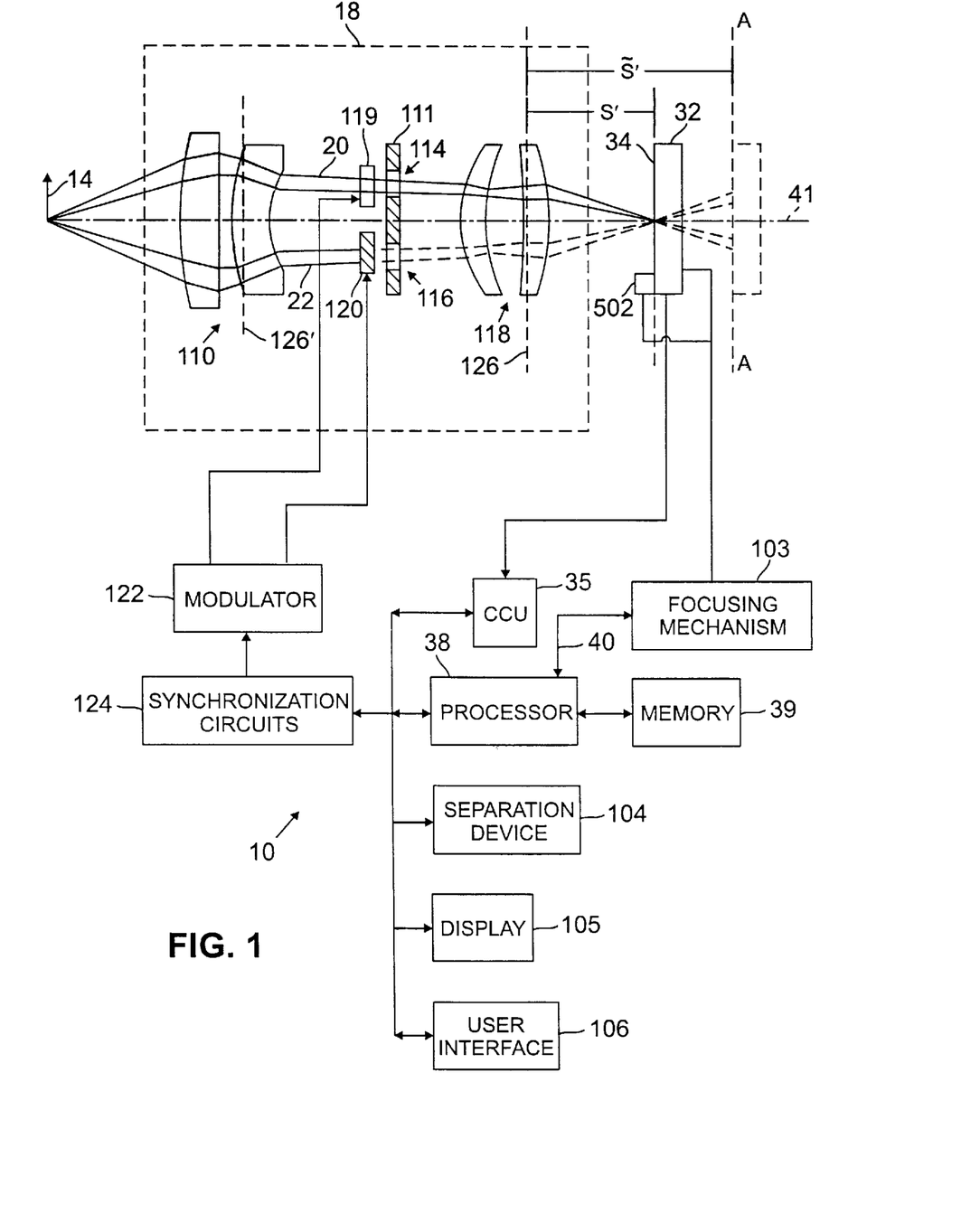
FIG. 1 schematically shows an autofocusing stereoscopic system including an image pickup device.

Referring to FIG. 1, a stereo optical system 10 includes a stereo optical assembly 18 that forms separate right and left view light beams 20, 22 from a commonly-viewed object 14. Optical assembly 18 directs left and right light beams 20, 22 onto a surface 34 of an image pickup device 32, where they form left and right images of object 14, respectively. The quality with which the left and right images are focused on image pickup device 32 is directly related to the amount by which the left and right images coincide with each other on surface 34 of device 32.

Camera control unit 35 contains the standard circuits that control image pickup device 32. Camera control unit 35 acquires the images from image pickup device 32 and converts them to digital, electrical signals. Image processor 38 receives the electrical signals representing the left and right images from camera control unit 35. (In some embodiments, image processor 38 is contained within camera control unit 35.) Image processor 38 performs various functions on the electrical signals. For example, image processor 38 uses the electrical signals to measure the degree of coincidence between left and right images on surface 34 of image pickup device 32 (two techniques for doing so are described in detail below) and stores this value in a memory circuit 39. Image processor 38 also performs digital signal processing and other operations that prepare the signals for display. For example, image processor 38 performs real-time "line-doubling" on the signals to provide a flicker-free 60 Hz field rate for each displayed image.

Image processor 38 is linked to a focusing mechanism 103 that includes a digitally controlled motor connected to image pickup device 32. Image processor 38 supplies a control signal 40 that indicates the degree of coincidence of the left and right images to focusing mechanism 103. The motor in focusing mechanism 103 responds to control signal 40 by moving device 32 along optical axis 41, thereby changing the spacing between optical assembly 18 and surface 34 to adjust the coincidence—and hence the quality of focus—of the left and right images on surface 34.

Image processor 38 sends the processed electrical signals that represent the left and right images to an image separation device 104 and display 105 that together produce a three-dimensional image of object 14 for the viewer. For example, in a head-mounted viewing system, image separation device 104 sends the left and right images to separate liquid crystal displays 105, each of which is visible to only one of the viewer's eyes. Other embodiments of image separation device 104 and display 105 are described in detail below.

The viewer controls the system through user interface 106 connected to display 105. In a preferred embodiment, user interface 106 includes light pens for use with a display 105 having a light sensitive screen. The viewer chooses an object for focus by circling the image of the object on the screen using a light pen. System 10 then focuses the image of the object on surface 34 of image pickup device 32, as described in more detail below.

In optical assembly 18, light from object 14 passes through a first lens group 110 to an aperture plate 111. Aperture plate 111 has right and left apertures 114, 116 situated symmetrically about optical axis 41 and along the horizontal axis of image pickup device surface 34. Right and left apertures 114, 116 in plate 111 separately define right light beam 20 and left light beam 22, respectively. The light beams 20, 22 form right and left images on surface 34 after passing through second lens group 118. Apertures 114, 116 are provided with shutters 119, 120 controlled by a modulator 122. Shutters 119, 120 are, for example, electromechanical devices, such as rotating obturators, or electro-optical devices, such as liquid crystal device (LCD) shutters.

Synchronization circuits 124 cause modulator 122 to alternately open (and close) shutters 119, 120 to allow right light beam 20 and left light beam 22 to sequentially pass to image pickup device 32 via lens group 118. (During operation the states (open and closed) of shutters 119, 120 are complementary.) Synchronization circuits 124 are typically embedded in camera control unit 35 and image processor 38, but are shown separately for clarity.

Synchronization circuits 124 also synchronize image separation device 104 and display 105 with modulator 122. For example, in the head-mounted system described above, synchronization circuits 124 ensure that the corresponding left and right images are displayed on each separate display 105 simultaneously. The synchronization of alternative types of image separation devices 104 and displays 105 is described below. Synchronization circuits 124 also synchronize the display sweep of display 105 and the output of camera control unit 35 with the real time image enhancement operations (such as line-doubling) of image processor 38. Clock signals supplied by synchronization circuits 124 also allow image processor 38 to divide the stream of signals arriving from camera control unit 35 into signals corresponding to the left and right images.

Image pick-up device 32 is, for example, a solid-state, charge-coupled device (CCD) that receives the right and left beams 20, 22 at an array of photosensitive pixels on surface 34. When right and left beams 20, 22 are in focus on surface 34, by definition surface 34 is spaced by a distance s' from the second principal plane 126 of optical assembly 18. (The second principal plane is the plane from which the focal length of optical assembly 18 is determined.) The spacing between surface 34 and second principal plane 126 when beams 20, 22 are out of focus will be denoted as $\tilde{s}'$. The initial spacing between surface 34 and second principal plane 126 is selected to place device 32 is in approximately the center of its range of motion, so that device 32 can be moved equally in opposite directions with respect to optical assembly 18.

Figure 2:
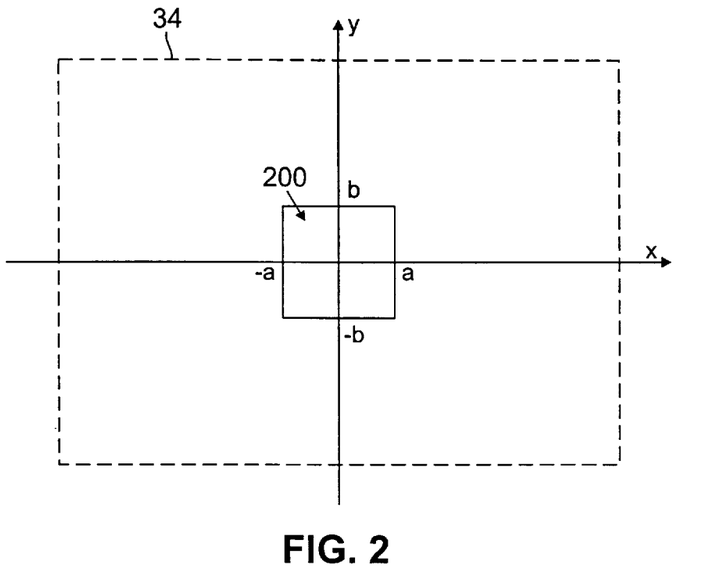
FIG. 2 schematically shows the surface of the image pickup device of FIG. 1 during a focusing operation.

Referring also to FIG. 2, image processor 38 controls the focus of the left and right images by first comparing the portions of the electrical signals produced by the pixels in a sighting area 200 of surface 34. Area 200 is rectangular and is bound by the lines x=-a, x=a, y=-b and y=b, where x and y are the Cartesian coordinates of surface 34, the origin passing through optical axis 41 (FIG. 1), and a and b are real constants. Put another way, the portions of the images received by pixels nearer the periphery of surface 34 are not used to determine the degree of coincidence of the left and right images. This is because the viewer typically aims system 10 so that the image of object 14 occupies the center of display 105, and thus the center of surface 34. Thus the image of object 14 is focused when maximum coincidence between the left and right images occurs at or near the center of surface 34.

Figure 3:
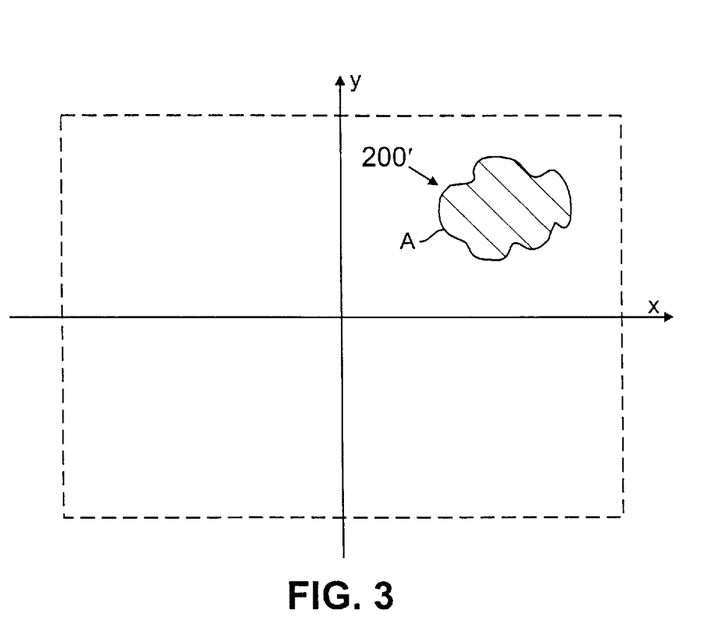
FIG. 3 schematically shows the surface of the image pickup device of FIG. 1 during another focusing operation.

Referring to FIG. 3, when the user chooses another object for focus, sighting area 200 shifts to include the image of the new object within a new sighting area 200'. For example, new sighting area 200' is confined within non-rectangular area A. The user chooses the new object by circling its image on a light sensitive screen included in display 105, as described above. System 10 is now focused when coincidence between the left and right images is maximum within sighting area 200'.

When the left and right images are at their highest level of focus (i.e., the spacing between surface 34 and second principal plane 126=s' in FIG. 1), the correlation between the electrical signals corresponding to the left image and the electrical signals corresponding to the right image is maximized within region 200 (or within region 200'). Conversely, the difference between these sets of electrical signals is minimized. The invention allows either of these relationships to be used to perform autofocusing.

Optical system 10 becomes defocused when the distance $\tilde{s}'$ changes such that surface 34 intercepts the left image and the right image proximally or distally of the image plane, for example, at the position labelled "A" in FIG. 1. This causes the left image and the right image to be displaced in opposite directions from sighting area 200 (200'), thereby lowering the correlation (and increasing the difference) between the electrical signals corresponding to the left and right images. The image is then refocused by changing spacing $\tilde{s}'$ to either maximize the correlation between the signals in area 200 (200'), or minimize the difference between the signals in area 200 (200') and therefore bring $\tilde{s}'$ to s' (so that device 32 is conjugate to object 14).

Image processor 38 determines the cross-correlation $K(\tilde{s}')$ of the electrical signals in region 200 as:

$$K(\tilde{s}')=\int^a_{-a}\int^b_{-b}u(x,y,\tilde{s}')v(x,y,\tilde{s}')dydx \qquad (1)$$

where $u(x,y,\tilde{s}')$ is the normalized intensity distribution of the left image within sighting area 200 of surface 34 and $v(x,y,\tilde{s}')$ is the normalized intensity distribution of the right image within the same region of surface 34, as indicated by successive electrical signals from camera control unit 35. When sighting region 200' is used, the limits of integration are changed from (-a,a) and (-b,b) to those needed to integrate over region A. Image processor implements Equation (1) as a finite sum.

Figure 4:
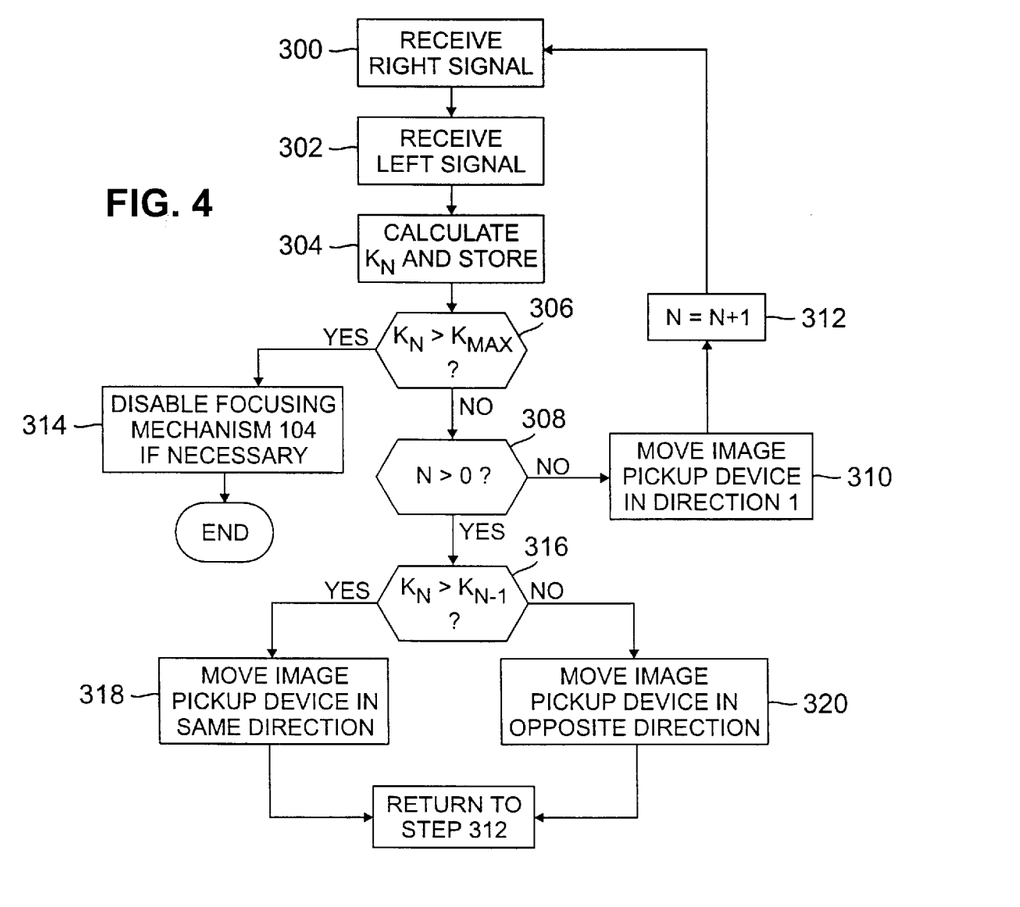
FIG. 4 is a flowchart for the focusing operations performed by the system of FIG. 1.

Referring to FIG. 4, image processor 38 focuses optical system 10 on object 14 using an iterative process. Image processor 38 first receives an electrical signal corresponding to a part of an image (e.g., a right signal corresponding to the right image) contained in sighting area 200 (200') (step 300). Image processor 38 stores the right image in memory circuit 39 (FIG. 1). After image processor 38 receives the subsequent electrical signal corresponding to the left image (the left signal) (step 302), it multiplies the left signal corresponding to each pixel within sighting area 200 (200') by the stored right signal corresponding to the same pixel, and adds the result over all the pixels in sighting area 200 (200') to produce $K_n(\tilde{s}')$ (step 304), where n is the index of the iteration. The first time image processor 38 calculates $K_n(\tilde{s}')$, the index n of the iteration is zero. Image processor 38 stores this value of $K_0(\tilde{s}')$ in memory circuit 39.

Image processor 38 then compares $K_0(\tilde{s}')$ to a preset threshold value $K_{max}(s')$, which indicates the minimum value the correlation will have when the left and right images are focused (step 306). The threshold $K_{max}(s')$ is chosen to ensure a given depth of focus. If $K_0(\tilde{s}')$ equals or exceeds the threshold $K_{max}(s')$, the image is focused and the process ends. If, however, the correlation has not yet reached the threshold, image processor 38 checks whether it has calculated $K_n(\tilde{s}')$ for the first time, i.e., whether n is zero (step 308). Because n is zero in this example, image processor 38 produces a control signal 40 that causes the motor in focusing mechanism 103 to move image pickup device 32 in an arbitrary direction (direction 1) (step 310).

The index of the iteration n is increased by one (step 312), and image processor 38 receives a new pair of successive left and right signals from camera coupling unit 35. Image processor 38 then calculates $K_1(\tilde{s}')$ using the new pair of signals, and compares $K_1(\tilde{s}')$ to $K_{max}(s')$. If $K_1(\tilde{s}')$ equals or exceeds $K_{max}(s')$, image processor 38 disables focusing mechanism 103 by sending a new control signal 40 that causes the motor to stop moving image pickup device 32 (step 314). If $K_1(\tilde{s}')$ has not yet reached $K_{max}(s')$, image processor 38 compares $K_1(\tilde{s}')$ to its previous stored value $K_0(\tilde{s}')$ (step 316). If the new value $K_1(\tilde{s}')$ exceeds the old value $K_0(\tilde{s}')$, image processor 38 maintains control signal 40 that causes focusing mechanism 103 to move image-pickup device 32 in the same direction (step 318). If $K_1(\tilde{s}')$ is smaller than $K_0(\tilde{s}')$, image processor 38 produces a new control signal 40 that causes mechanism 103 to move image pickup device 32 in the opposite direction (step 320). Image processor 38 then returns to step 312, and repeats the process until the correlation exceeds the threshold, and the images are focussed.

Because the time between each iteration is small, image processor 38 calculates the correlation virtually instantaneously and continuously. As a result, image processor 38 does not need to stop focusing mechanism 103 from moving image pickup device 32 between iterations. By continuously calculating and comparing $K(\tilde{s}')$ in this manner, image processor 38 rapidly detects any defocusing of image detector 32, and responds by causing focusing mechanism 103 to quickly compensate for the defocusing. Defocusing occurs, e.g., when optical system is moved by the user, causing the distance between object 14 and optical assembly 18 to change.

Image processor 38 also applies known averaging and thresholding techniques in its calculations of $K(\tilde{s}')$ to prevent excessive sensitivity to noise and jitter in the electrical signals arriving from unit 35.

Other embodiments are within the scope of the claims.

For example, focusing mechanism 103 can include a stepper motor which moves image pickup device 32 by a fixed distance (d) each time it is enabled by control signal 40. Alternatively, image processor 38 sends control signals 40 that cause stepper motor to vary the distance (d). For example, when the correlation is close to the threshold, image processor 38 causes the stepper motor to decrease distance d, to more accurately locate the position of maximum correlation.

The focussing process need not end when the correlation exceeds the threshold. Instead, focussing can continue until a fixed number of iterations (n) have occurred. The maximum number of iterations should be selected to be sufficiently high to ensure that image processor 38 has sufficient time to locate the maximum correlation.

Figure 5:
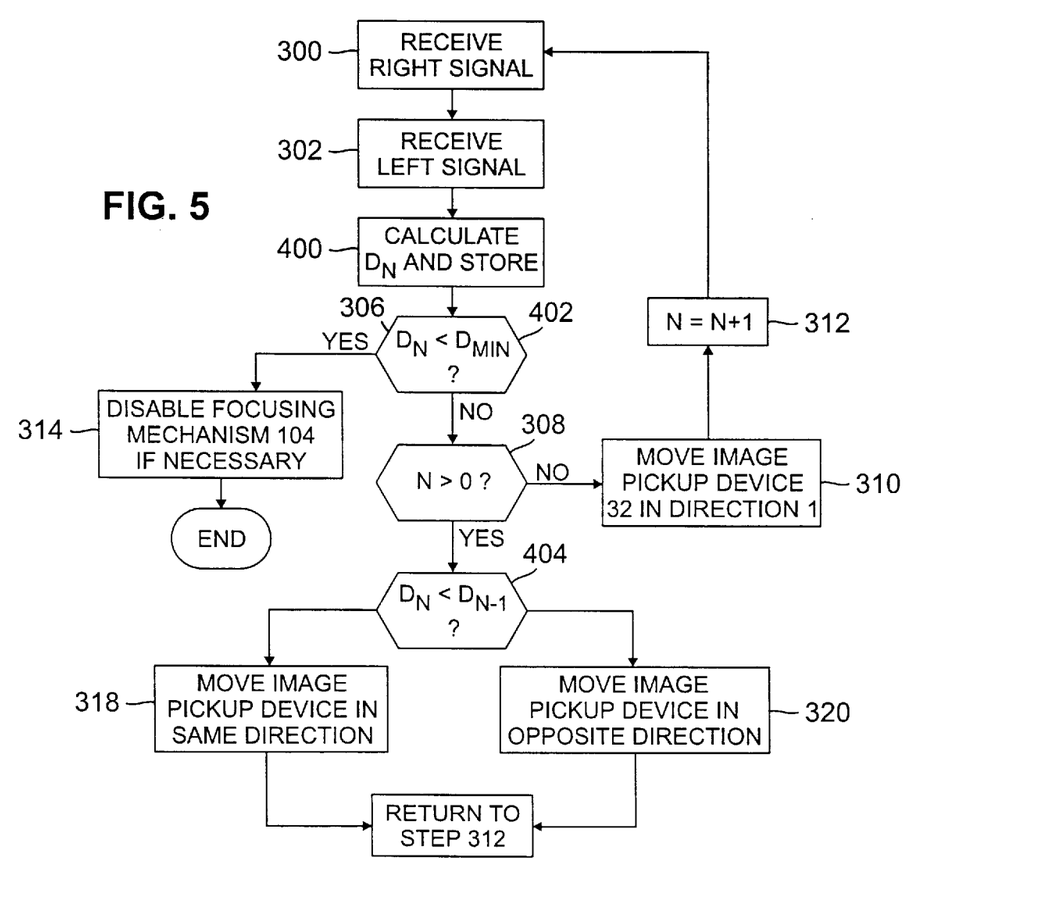
FIG. 5 is a flowchart for an alternative focusing operation performed by the system of FIG. 1.

Referring to FIG. 5, image processor 38 can alternatively control the focusing by minimizing a difference metric $D(\tilde{s}')$ between the left image and the right image over sighting area 200 (200'). $D(\tilde{s}')$ is defined by:

$$D(\tilde{s}') = \int^a_{-a} \int^b_{-b} |u(x,y,\tilde{s}') - v(x,y,\tilde{s}')| dy dx \qquad (2)$$

(The limits of integration are changed to those needed for area A when sighting area 200' (FIG. 3) is used.)

Image processor 38 focuses optical system 10 in a manner analogous to that shown in FIG. 4 (identical reference numerals have been used in FIG. 5 to indicate steps that are the same as those in FIG. 4). After receiving the right and left signals (steps 300 and 302), image processor 38 calculates $D_n(\tilde{s}')$ (step 400). $D_n(\tilde{s}')$ is then compared to a preset threshold $D_{min}(s')$ which is chosen to ensure a given depth of focus (step 402). If $D_1(\tilde{s}')$ is less than or equal to $D_{min}(S')$, the process ends. If, however, $D_1(\tilde{s}')$ is greater than $D_{min}(s')$, image processor 38 instructs focussing mechanism 103 to move image pickup device 32 in an arbitrary direction (step 310), and calculates the next value $D_1(\tilde{s}')$. Image processor 38 then compares $D_1(\tilde{s}')$ to $D_0(\tilde{s}')$ (step 404). If $D_1(\tilde{s}')$ is less than the previous value $D_0(\tilde{s}')$, image processor 38 causes focusing mechanism 103 to continue moving image pickup device 32 in the same direction (step 318). If the new value of $D_n(\tilde{s}')$ exceeds the previous value, image pickup device 32 is moved in the opposite direction (step 320). Image processor 38 continues to process the left and right images in a manner analogous to that described in connection with FIG. 4 until the difference function $D_n(\tilde{s}')$ falls below the threshold $D_{min}(s')$.

Figure 6:
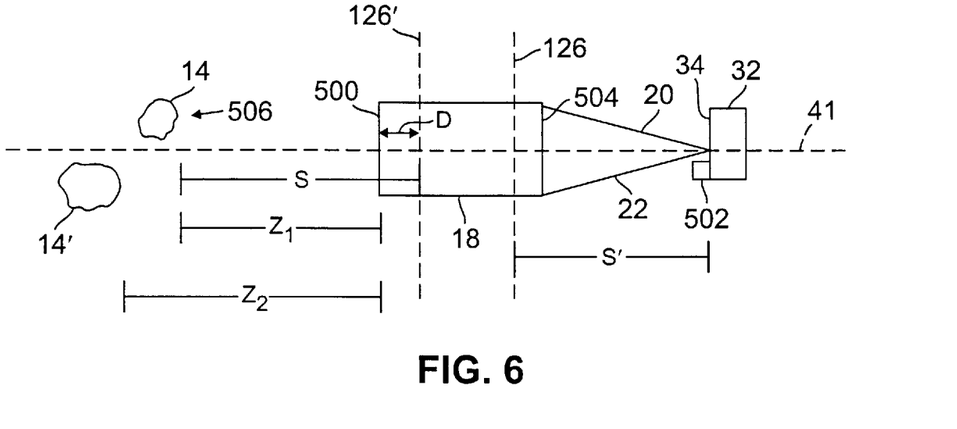
FIG. 6 schematically shows a side view of the stereoscopic system of FIG. 1 during rangefinding and videometry.
Figure 7:
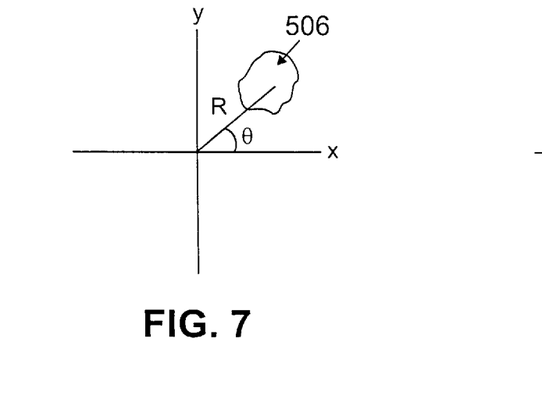
FIG. 7 schematically shows a front view of the object being imaged by the system of FIG. 6.

Referring to FIGS. 6 and 7, after the left and right images are maximally focused, (e.g., by any of the techniques described herein), image processor 38 performs rangefinding (determining the distance $Z_1$ of object 14 from optical assembly 18 along optical axis 41) and videometry (determining the area and position of object 14 in the plane perpendicular to optical axis 41), as follows.

The object distance s from object 14 to the first principal plane 126' of optical assembly 18 (see also FIG. 1) is given by:

$$1/s' = 1/f + 1/s; \text{ or, } s = \frac{s'f}{f - s'} \qquad (3)$$

where s is negative for real objects, s' is the distance from the second principal plane 126 of optical assembly 18 to surface 34 of image pickup device 32 when system 10 is focused, and f is the focal length of optical assembly 18. Thus, the object distance s can be derived from the focal length f of optical assembly 18 and the focused distance s'. Once s is known, the distance from a distal end 500 of optical assembly 18 to object 14 is calculated by subtracting from s the distance D from first principal plane 126' to distal end 500 of optical assembly 18.

The optical characteristics of optical assembly 18 are fixed during operation for any particular stereoscopic system 10. Thus, all the parameters pertinent to rangefinding (e.g., the spacing between principal planes 126, 126', the location of first principal plane 126' relative to distal end 500, and the focal length f) are derived from the lens design and stored in memory circuit 39. Alternatively, the focal length can be determined during an initial calibration of optical assembly 18.

The image distance s' is measured during use for every new object 14 shown on display 105. This is typically accomplished by placing a distance sensing device 502, e.g., a fiber-optic sensor, on image pickup device 32. Distance sensing device 502 is connected to focusing mechanism 103 (FIG. 1). Alternatively, distance sensing device 502 is placed in optical assembly 18, or is connected directly to image processor 38.

Once the system is focused, distance sensing device 502 finds the distance to proximal end 504 of optical assembly 18 and transmits the distance value to image processor 38, which stores the value in memory circuit 39. Image processor 38 then calculates the image distance s' by adding the distance from second principal plane 126 to proximal end 504 of optical assembly 112 to the distance value transmitted by the sensing device 502.

Alternatively, when a stepper motor with a fixed distance step (d) is employed in focusing mechanism 103, the location of image pickup device 32 relative to optical assembly 18 is found by keeping track of how image pickup device 32 is moved during focusing (i.e., during the procedure shown in FIG. 4 or FIG. 5). If the starting position of image pickup device 32 is recorded during calibration, its location when system 10 is focused is found by analyzing in what direction stepper motor moved at each iteration of the focusing process.

In theory, image processor 38 can calculate the object distance s from the stored values of s' and f, as shown by Equation (3). However, Equation (3) cannot be used when the object distance (s) is much greater than the image distance (s'), because any small error in the value of s' leads to unacceptably large errors in the calculated value of s. This can be seen by differentiating Equation (3) to obtain:

$$\frac{ds}{s} = \frac{(s+f)^2}{sf^2} ds' \quad (4)$$

where ds is the absolute error in the object distance, ds/s is the relative error in the object distance, and ds' is the absolute error in the image distance, which is constant for any given distance sensing device 502.

Equation (4) shows that as s approaches infinity for a constant image distance error ds', the relative error ds/s also increases to infinity. This indicates that rangefinding is accurate for only small object distances s. (The effects of inaccuracies in the focal length f can be determined in a similar manner; however, because f can be measured with a high degree of accuracy by calibration or otherwise, it is not typically a significant source of error.)

The range of object distances s that can be measured with a given relative error ds/s is limited, as follows. Given that the focal length f and the error in the image distance s' are constant, we assume s=−kf, where k is a positive constant. Substituting for s in Equation (4), we obtain:

$$\frac{(k-1)^2}{k} = -\frac{f}{ds'} \frac{ds}{s} \quad (5)$$

Defining a maximum acceptable value for the absolute value of the relative error |ds/s| as $D_{max}$, we obtain:

$$\frac{(k-1)^2}{k} < c \quad (6)$$

where $$c \equiv \frac{f}{|ds'|} D_{max}$$

and c is a positive constant. Solving Expression (6) for k gives:

$$(c/2+1) - \sqrt{(c/2+1)^2 - 1} < k < (c/2+1) + \sqrt{(c/2+1)^2 - 1} \quad (7)$$

Substituting for the object distance |s|=kf yields:

$$f(c/2+1) - f\sqrt{(c/2+1)^2 - 1} < |s| < f(c/2+1) + f\sqrt{(c/2+1)^2 - 1} \quad (8)$$

The lower bound for k Expression (7) is less than one, indicating that the magnitude of the object distance |s| (Expression (8)) may be smaller than the focal length f. In situations where this is not possible, a more accurate lower bound for the object distance s can be found. For example, in most endoscopes, the distance D between front end 504 of optical assembly 18 and front principal plane 126' is greater than 1.3f, so the left side of Expression (7) does not determine the lower bound of the operating range. In practice, the minimum object distance $|s|_{min}$ in an endoscope is limited by the maximum image distance $s'_{max}$ allowed by focusing mechanism 103. Equation (3) indicates that:

$$|s|_{min} = \frac{s'_{max} f}{s'_{max} - f} \quad (9)$$

Thus the acceptable range of object distances in the endoscope is provided by:

$$\frac{s'_{max} f}{s'_{max} - f} < |s| < f\left[(c/2+1) + \sqrt{(c/2+1)^2 - 1}\right] \quad (10)$$

In a typical application, the maximum relative error in the object distance is limited to 5% ($D_{max}$=0.05), the absolute error in the image distance is 0.025 mm (ds'=0.025 mm), optical assembly 18 has a focal length of 5 mm (f=5 mm) and the maximum image distance is 20 mm ($s'_{max}$=20 mm). Using Expressions (6) and (10), the object distance which can be determined with 5% accuracy is within the range:

$$6.7 \text{ mm} < |s| < 59.6 \text{ mm} \quad (11)$$

a span which covers most endoscopic applications.

In operation, a user observes the stereoscopic image on display 105. Once autofocusing is complete, distance sensing device 502 determines the value of s' and sends this value to image processor 38, which then calculates s from Equation (3). Image processor 38 converts the value of s to the distance of object 14 from distal end 500 of optical assembly 18, and displays this value to the user on display 105.

The user may then choose another object 14' (FIG. 6) on display 105 on which to focus by outlining the area of object 14', as described above. The entire process of autofocusing and rangefinding is then repeated for new object 14'. This is done by calculating the correlation of the left and right images in the portion of surface 34 of image pickup plane 32 on which the image of object 14' appears (e.g., on portion 200' shown in FIG. 3). Image processor 38 then uses the procedure shown in either FIG. 4 or FIG. 5 to focus the image of object 14' in area 200'. Alternatively, optical system 10 is moved until the image of object 14' falls on the center of surface 34 of image pickup device 32, e.g., by ensuring that object 14' is shown in the center of display 105. Image processor 38 then performs the focusing procedure to focus the image of object 14' in area 200.

Image processor 38 determines and stores the object distance $Z_2$ to object 14' along optical axis 41, in the manner described above. Image processor 38 then finds the distance between the two objects 14, 14' along optical axis 41 by subtracting the two stored object distances $Z_1$ and $Z_2$, and displays this value to the user on display 105.

In endoscopic applications, it is often desirable to use an appropriate fixture to avoid movement of the endoscope during rangefinding. For example, a robotic arm or other suitable device can be used to hold the endoscope stationary during rangefinding.

Figure 8:
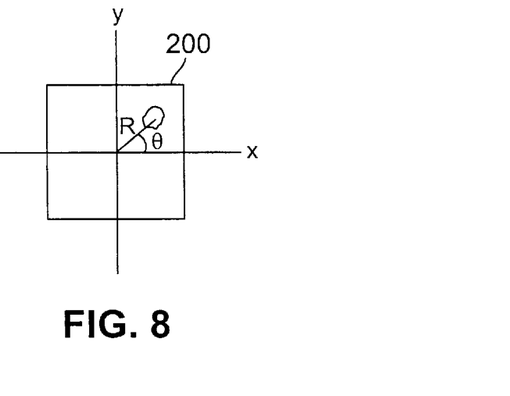
FIG. 8 schematically shows an image of the object formed on a surface of the image pickup device in the system of FIG. 6.

Referring to FIGS. 7 and 8, image processor 38 performs videometry to locate the coordinates of a projection of object 14 on the object plane 506 (i.e., the plane including object 14 perpendicular to optical axis 41 and parallel to surface 34 of image pickup device 32). In a first order approximation, and in the absence of radial distortion, the polar radius (R) of object 14 in the object plane is:

$$R = r_p/m \qquad (12)$$

where $$R = \sqrt{X^2 + Y^2} \quad ; \quad r_p = \sqrt{x_p^2 + y_p^2} \quad ; \quad m = \frac{f}{s+f}$$

where X and Y are the coordinates of object 14 in the object plane, $r_p$ is the polar radius of the ideal image on surface 34 of image pickup device 32, $x_p$ and $y_p$ are the coordinates of the ideal image on surface 34 of image pickup device 32, and m is the paraxial magnification of optical assembly 18. Surface 34 of image pickup device 32 and the object plane are intersected at their origins by optical axis 41. The polar radii R and $r_p$ are parallel, i.e., the angle formed by $r_p$ with respect to x and the angle formed by R with respect to X are equal. R and $r_p$ are typically chosen to fall on the approximate center of object 14 and its image, respectively.

Once rangefinding is accomplished and the object distance s is found, image processor 38 converts (using Equation (12)) the polar radius r of the image of object 14 in the image plane to the polar radius R of object 14 in the object plane. Image processor 38 may similarly transpose the location of points defining the contour of the image of object 14 from the image plane to the object plane.

When radial distortion of the image is significant (e.g., in endoscopic applications), Equation (12) is modified to:

$$R = \frac{r}{m(D_r+1)} = \frac{r(s+f)}{f(D_r+1)} \qquad (13)$$

$$\text{where } D_r = \frac{r - r_p}{r_p}$$

$$\text{and } r = \sqrt{x^2 + y^2}$$

where r is the polar radius of the actual (distorted) image on surface 34 of image pickup device 32, x and y are the coordinates of the actual image on surface 34, $r_p$ is the polar radius of the corresponding ideal (paraxial) image and $D_r$ is the radial distortion factor. $D_r$ is fixed for a given image pickup device 32. $D_r$ is found by, for example, imaging an object 14 placed on a grid and comparing the corresponding image on display 105 to object 14.

After focusing and rangefinding are complete, image processor 38 determines the position of object 14 (X,Y) from its polar radius R and the polar angle (Θ) made by r with the x axis on the image plane. Because rangefinding also provides the distance of object 14 along optical axis 41 (corresponding to the z-coordinate of object 14), the position of object 14 is completely specified.

Once the coordinates of two objects 14 are found, image processor 38 finds the actual distance between objects 14, 14' i.e., the distance given by $\text{sqrt}[(X_1-X_2)^2+(Y_1-Y_2)^2+(Z_1-Z_2)^2]$, where $(X_1,Y_1,Z_1)$ are the coordinates of the first object 14, and $(X_2,Y_2,Z_2)$ are the coordinates of the second object 14'. In addition, after the user chooses a particular object 14 on display 105 by outlining the object's contour via user interface 106, as described above, image processor 38 finds the polar radius R for a set of points falling on the contour. Image processor 38 then determines the area (A) of object 14 projected on the object plane using the formula:

$$A = \frac{(s+f)^2}{f^2} \int\int_\Sigma \frac{1}{(D_r+1)^2} \, dxdy \qquad (14)$$

where Σ is the area of the image. Image processor 38 implements Equation (14) as a discrete sum.

Figure 9:
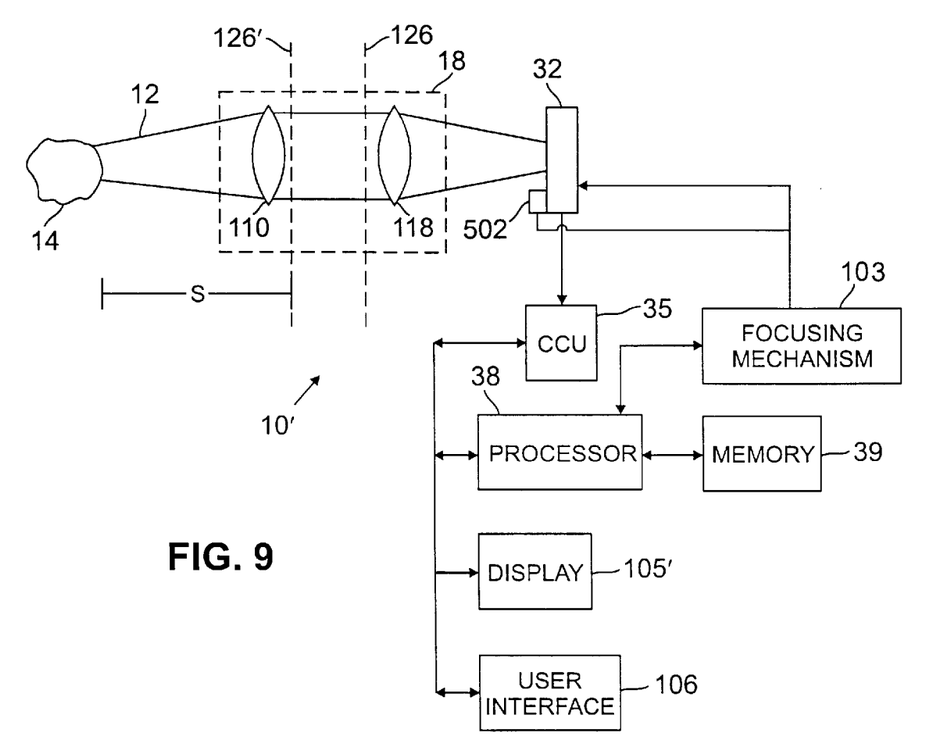
FIG. 9 schematically shows a side view of a two-dimensional imaging system during rangefinding and videometry.

Referring to FIG. 9, the rangefinding and videometry techniques described above can also be performed on a two-dimensional imaging system 10', e.g., a video camera. The light received from object 14 forms a single image on image pickup device 32, which is focused in any conventional manner. Camera control unit 35 drives image pickup device 32, and image processor 38 performs the rangefinding and videometry functions described above. Two-dimensional display 105' (e.g., a television monitor) displays the focused image, as well as the distance s to the object, the position of the object in the object plane, and the area of the object projected on the object plane. The viewer interacts with imaging system 10' through user interface 106.

In other embodiments, focusing mechanism 103 is connected to move optical assembly 18 with respect to image pickup device 32, or focusing mechanism 103 is connected to move optical assembly 18 and image pickup device 32 in opposite directions. If optical assembly 18 includes a varifocal lens construction, focusing mechanism 103 is connected to move internal parts of optical assembly 18 (rather than the entire assembly 18) to vary its focal length.

The invention can be used in conjunction with a variety of image separation devices 104 and displays 105. For example, in some embodiments, image separation device 104 sends the right and left signals to separate displays 105 that are closely spaced and visible to both of the viewer's eyes.

In other systems, the left and right images are shown sequentially on a display 105 that includes a single monitor. Image separation device 104 includes "active glasses" worn by the user that have a shutter (e.g, a liquid crystal shutter) in front of each eye. (In this embodiment, image separation device 104 is not connected to image processor 38, as shown in FIG. 1.) The shutters are synchronized with the images displayed on the monitor, so that the left shutter is open and the right shutter closed when the left image is displayed on the screen, allowing the observer's left eye to see only the left displayed image. When the right image is displayed, the right shutter is open and the left shutter is closed, allowing the observer's right eye to see only the right displayed image. Because the switching rate of the left and right images is high, the viewer experiences the left and right images as being displayed simultaneously on the screen.

In other systems, the observer wears passive glasses the lenses of which have opposite polarizations, and image separation device 104 includes a liquid-crystal screen placed in front of the monitor in display 105. The screen changes its polarization in phase with the image switching rate (the frame rate) of the display. The passive glasses allow only the appropriately polarized image to reach each of the observer's eyes, thereby allowing the observer to see a three-dimensional image. One example of such a liquid-crystal screen is available from Tektronix, Inc.

If active glasses are used, synchronization circuits 124 cause the shutters on the glasses to alternate between open and shut states at the same rate as shutters 119, 120. Alternatively, if an active monitor is used, the polarization switch rate of the monitor is synchronized with the switching rate of shutters 119, 120.

Other systems, known as autostereoscopic displays, employ a lateral multiplexing technique in which two or more laterally adjacent views of object 14 are multiplexed onto a single display 105. Image separation device 104 causes display 105 to emit each adjacent image only in a limited direction, causing each of the observer's eyes to see a different image. Image separation device 104 is provided by a lenticular screen that has cylindrical microlenses on its surface that separate the adjacent images in the azimuthal direction.

Time sequential lateral multiplexing is also possible. In this technique, laterally adjacent images are displayed on display 105 in succession. Image separation device 104 synchronized with the rate of image switching (the frame rate) directs the images separately to the viewer's eyes.

What is claimed is:

1. A method for focusing a stereoscopic image of an object on an image pickup device, comprising using an optical element axially spaced from said image pickup device to apply a left image and a right image of the object to said image pickup device so that said image pickup device produces signals representative of said left image and signals representative of said right image, said optical element and said image pickup device being arranged such that changing the axial spacing between said optical element and said image pickup device produces relative displacement between said left image and said right image on said image pickup device, comparing said signals representative of said left image with said signals representative of said right image to determine a coincidence between said left image and said right image on said image pickup device, and changing the axial spacing between said optical element and said image pickup device to produce relative displacement of said left image and said right image on said image pickup device to increase the coincidence between said left image and said right image on said image pickup device, and thereby increase the focusing of said left image and said right image on said image pickup device.

2. The method of claim 1 wherein said comparing includes finding a correlation between said left image and said right image on said image pickup device based on said signals representative of said left image and said signals representative of said right image.

3. The method of claim 2 further comprising changing said axial spacing to maximize said correlation.

4. The method of claim 2 wherein said comparing further comprises determining, based on said signals representative of said left image and said signals representative of said right image, a cross correlation metric $K(\tilde{s}')$ between a normalized intensity distribution $u(x,y,\tilde{s}')$ of said left image on a region of a surface of said image pickup device, and a normalized intensity distribution $v(x,y,\tilde{s}')$ of said right image on said region of said surface, such that:

$$K(\tilde{s}')=\int_A\int u(x,y,\tilde{s}')v(x,y,\tilde{s}')dydx$$

wherein A represents an area in x, y coordinates of said region of said surface, and $\tilde{s}'$, defines a distance between said optical element and said image pickup device along an optical axis of said image pickup device.

5. The method of claim 1 wherein said comparing includes determining a difference between said left image and said right image on said image pickup device based on said signals representative of said left image and said signals representative of said right image.

6. The method of claim 5 further comprising changing said axial spacing to minimize said difference.

7. The method of claim 5 wherein said comparing further comprises determining, based on said signals representative of said left image and said signals representative of said right image, a difference metric $D(\tilde{s}')$ between a normalized intensity distribution $u(x,y,\tilde{s}')$ of said left image on a region of a surface of said image pickup device, and a normalized intensity distribution $v(x,y,\tilde{s}')$ of said right image on said region of said surface, such that:

$$D(\tilde{s}')=\int_A\int |u(x,y,\tilde{s}')-v(x,y,\tilde{s}')|dydx$$

wherein A represents an area in x, y coordinates of said region of said surface, and $\tilde{s}'$ defines a distance between said optical element and said image pickup device along an optical axis of said image pickup device.

8. The method of claim 1 further comprising performing said comparing only for portions of said left image and said right image that are received in a selected region of a surface of said image pickup device.

9. The method of claim 8 wherein said selected region is a central region of said surface.

10. The method of claim 1 wherein the step of changing the axial spacing between said optical element and said image pickup device includes moving at least said optical element.

11. The method of claim 1 wherein the step of changing the axial spacing between said optical element and said image pickup device includes moving at least said image pickup device.

12. The method of claim 1 wherein the step of applying includes applying said left image and said right image in different time intervals to a common element of said image pickup device so that said common element produces, in said different time intervals, said signals representative of said left image and said signals representative of said right image.

13. The method of claim 12 further comprising sequentially shuttering said left image and said right image to successively apply said left image and said right image to said common element of said image pickup device.

14. The method of claim 1 wherein said optical element and said image pickup device are arranged such that said relative displacement includes movement of said left image and said right image in opposite directions on said image pickup device.

15. A method for focusing a stereoscopic image on a surface of an image pickup device, comprising (a) applying a left image of the object and a right image of the object from an optical element to a surface of said image pickup device axially spaced from said optical element so that said image pickup device produces signals representative of said left image and signals representative of said right image, said optical element and said image pickup device being arranged such that changing the axial spacing between said optical element and said image pickup device produces relative displacement between said left image and said right image on said image pickup device, (b) determining a correlation between said signals representative of said left image and said signals representative of said right image, (c) changing the axial spacing between said optical element and said image pickup device in response to said correlation to produce relative displacement of said left image and said right image on said image pickup device, and (d) repeating steps (a), (b), and (c) to maximize said correlation, so as to increase the focusing of said left image and said right image on said image pickup device.

16. The method of claim 15 wherein said optical element and said image pickup device are arranged such that said relative displacement includes movement of said left image and said right image in opposite directions on said image pickup device.

17. A method for focusing a stereoscopic image on a surface of an image pickup device, comprising (a) applying a left image of the object and a right image of the object from an optical element to a surface of said image pickup device axially spaced from said optical element so that said image pickup device produces signals representative of said left image and signals representative of said right image, said optical element and said image pickup device being arranged such that changing the axial spacing between said optical element and said image pickup device produces relative displacement between said left image and said right image on said image pickup device, (b) determining a difference between said signals representative of said left image and said signals representative of said right image, (c) responding to said difference by changing the axial spacing between said optical element and said image pickup device to produce relative displacement of said left image and said right image on said image pickup device, and (d) repeating steps (a), (b), and (c) to minimize said difference, so as to increase the focusing of said left image and said right image on said image pickup device.

18. The method of claim 17 wherein said optical element and said image pickup device are arranged such that said relative displacement includes movement of said left image and said right image in opposite directions on said image pickup device.

19. A stereoscopic device comprising an optical element for producing a left image and a right image of an object, an image pickup device axially spaced from said optical element for receiving said left image and said right image and producing signals representative of said left image and signals representative of said right image, said optical element and said image pickup device being arranged such that changing the axial spacing between said optical element and said image pickup device produces relative displacement between said left image and said right image on said image pickup device, a processor for comparing said signals representative of said left image with said signals representative of said right image to determine whether said left image and said right image are in focus on said image pickup device, and a mechanism connected to said processor for changing the axial spacing between said optical element and said image pickup device to produce relative displacement of said left image and said right image on said image pickup device so as to bring said left image and said right image into focus on said image pickup device.

20. The device of claim 19 wherein said processor includes a correlator for determining a correlation between said left image and said right image on said image pickup device based on said signals representative of said left image and said signals representative of said right image.

21. The device of claim 20 wherein said mechanism changes said axial spacing to maximize said correlation.

22. The device of claim 20 wherein said correlator is further adapted to determine, based on said signals representative of said left image and said signals representative of said right image, a cross correlation metric $K(\tilde{s}')$ between a normalized intensity distribution $u(x,y,\tilde{s}')$ of said left image on a region of a surface of said image pickup device and a normalized intensity distribution $v(x,y,\tilde{s}')$ of said right image on said region of said surface, such that:

$$K(\tilde{s}')=\int_A \int u(x,y,\tilde{s}')v(x,y,\tilde{s}')dydx$$

wherein A represents an area in x, y coordinates of said region of said surface, and $\tilde{s}'$ defines a distance between said optical element and said image pickup device along an optical axis of said image pickup device.

23. The device of claim 19 wherein said processor includes a comparator for determining a difference between said left image and said right image on said image pickup device based on said signals representative of said left image and said signals representative of said right image.

24. The device of claim 23 wherein said mechanism is adapted to change said axial spacing to minimize said difference.

25. The device of claim 23 wherein said comparator is further adapted to determine, based on said signals representative of said left image and said signals representative of said right image, a difference metric $D(\tilde{s}')$ between a normalized intensity distribution $u(x,y,\tilde{s}')$ of said left image on a region of a surface of said image pickup device, and a normalized intensity distribution $v(x,y,\tilde{s}')$ of said right image on said region of said surface, such that:

$$D(\tilde{s}')=\int_A \int |u(x,y,\tilde{s}')-v(x,y,\tilde{s}')|dydx$$

wherein A represents an area in x, y coordinates of said region of said surface, and $\tilde{s}'$ defines a distance between said optical element and said image pickup device along an optical axis of said image pickup device.

26. The device of claim 19 wherein said processor is adapted to perform said comparing only for portions of said left image and said right image that are received in a selected region of a surface of said image pickup device.

27. The device of claim 26 wherein said selected region is a central region of said surface.

28. The device of claim 19 wherein said mechanism is coupled to said optical element and changes said axial spacing by moving at least said optical element.

29. The device of claim 19 wherein said mechanism is coupled to said image pickup device and changes said axial spacing by moving at least said image pickup device.

30. The device of claim 19 wherein said optical element includes a component for applying said left image and said right image in different time intervals to a common element of said image pickup device so that said common element produces, in said different time intervals, said signals representative of said left image and said signals representative of said right image, said processor performing said comparing based on said signals produced by said common element during said different time intervals.

31. The device of claim 30 wherein said optical element further includes
    a lens for receiving light from the object, and
    a left aperture and a right aperture for defining a left beam and a right beam from the light received by said lens, said left beam producing said left image when incident on said image pickup device and said right beam producing said right image when incident on said image pickup device,
    said component comprising a plurality of shutters for sequentially blocking and unblocking said left beam and said right beam to successively apply said left image and said right image to said common element of said image pickup device.

32. The device of claim 31 further comprising a modulator controlled by said processor for alternately opening said plurality of shutters to sequentially apply said left image and said right image in said different time intervals to said common element of said image pickup device.

33. The device of claim 31 wherein said optical element further comprises a second lens for directing said left image and said right image onto said common element of said image pickup device.

34. The device of claim 19 wherein said image pickup device includes at least one solid state device for receiving said left image and said right image.

35. The device of claim 34 wherein said at least one solid state device includes a charge coupled device.

36. The device of claim 19 wherein said optical element and said image pickup device are arranged such that said relative displacement includes movement of said left image and said right image in opposite directions on said image pickup device.

37. A stereoscopic system for viewing an object within a body, comprising
    an endoscope having a distal end for insertion into the body, said endoscope including
        an optical element for producing a left image and a right image of the object, and
        an image pickup device axially spaced from said optical element for receiving said left image and said right image and producing signals representative of said left image and signals representative of said right image, said optical element and said image pickup device being arranged such that changing the axial spacing between said optical element and said image pickup device produces relative displacement between said left image and said right image on said image pickup device,
    a processor for comparing said signals representative of said left image with said signals representative of said right image to determine whether said left image and said right image on said image pickup device, and
    a mechanism connected to said processor, said mechanism changing the axial spacing between said optical element and said image pickup device to produce relative displacement of said left image and said right image on said image pickup device so as to bring said left image and said right image into focus on said image pickup device.

38. The system of claim 37 wherein said optical element and said image pickup device are arranged such that said relative displacement includes movement of said left image and said right image in opposite directions on said image pickup device.

39. A method for focusing a stereoscopic image of an object on an image pickup device, comprising
    using an optical element spaced from said image pickup device to apply a left image and a right image of the object to said image pickup device so that said image pickup device produces signals representative of said left image and signals representative of said right image,
    comparing said signals representative of said left image with said signals representative of said right image to determine a correlation between said left image and said right image on said image pickup device by determining a cross correlation metric $K(\tilde{s}')$ between a normalized intensity distribution $u(x,y,\tilde{s}')$ of said left image on a region of a surface of said image pickup device, and a normalized intensity distribution $v(x,y,\tilde{s}')$ of said right image on said region of said surface, such that:

$$K(\tilde{s}')=\int_A \int u(x,y,\tilde{s}')v(x,y,\tilde{s}')dydx$$

wherein A represents an area in x, y coordinates of said region of said surface, and $\tilde{s}'$ defines a distance between said optical element and said image pickup device along an optical axis of said image pickup device, and
    changing the spacing between said optical element and said image pickup device to increase the correlation between said left image and said right image on said image pickup device.

40. A method for focusing a stereoscopic image of an object on an image pickup device, comprising
    using an optical element spaced from said image pickup device to apply a left image and a right image of the object to said image pickup device so that said image pickup device produces signals representative of said left image and signals representative of said right image,
    comparing said signals representative of said left image with said signals representative of said right image to determine a difference between said left image and said right image on said image pickup device by determining a difference metric $D(\tilde{s}')$ between a normalized intensity distribution $u(x,y,\tilde{s}')$ of said left image on a region of a surface of said image pickup device, and a normalized intensity distribution $v(x,y,\tilde{s}')$ of said right image on said region of said surface, such that:

$$D(\tilde{s}')=\int_A \int |u(x,y,\tilde{s}')-v(x,y,\tilde{s}')|dydx$$

wherein A represents an area in x, y coordinates of said region of said surface, and $\tilde{s}'$ defines a distance between said optical element and said image pickup device along an optical axis of said image pickup device, and
    changing the spacing between said optical element and said image pickup device to decrease the difference between said left image and said right image on said image pickup device.

41. A stereoscopic device comprising an optical element for producing a left image and a right image of an object, an image pickup device spaced from said optical element for receiving said left image and said right image and producing signals representative of said left image and signals representative of said right image, a processor for comparing said signals representative of said left image with said signals representative of said right image to determine whether said left image and said right image are in focus on said image pickup device, said processor including a correlator for determining a correlation between said left image and said right image on said image pickup device by determining a cross correlation metric $K(\tilde{s}')$ between a normalized intensity distribution $u(x,y,\tilde{s}')$ of said left image on a region of a surface of said image pickup device and a normalized intensity distribution $v(x,y,\tilde{s}')$ of said right image on said region of said surface, such that:

$$K(\tilde{s}')=\int_A\int u(x,y,\tilde{s}')v(x,y,\tilde{s}')dydx$$

wherein A represents an area in x, y coordinates of said region of said surface, and $\tilde{s}'$ defines a distance between said optical element and said image pickup device along an optical axis of said image pickup device, and a mechanism connected to said processor for changing the spacing between said optical element and said image pickup device to bring said left image and said right image into focus on said image pickup device.

42. A stereoscopic device comprising an optical element for producing a left image and a right image of an object, an image pickup device spaced from said optical element for receiving said left image and said right image and producing signals representative of said left image and signals representative of said right image, a processor for comparing said signals representative of said left image with said signals representative of said right image to determine whether said left image and said right image are in focus on said image pickup device, said processor including a comparator for determining a difference between said left image and said right image on said image pickup device by determining a difference metric $D(\tilde{s}')$ between a normalized intensity distribution $u(x,y,\tilde{s}')$ of said left image on a region of a surface of said image pickup device, and a normalized intensity distribution $v(x,y,\tilde{s}')$ of said right image on said region of said surface, such that:

$$D(\tilde{s}')=\int_A\int |u(x,y,\tilde{s}')-v(x,y,\tilde{s}')|dydx$$

wherein A represents an area in x, y coordinates of said region of said surface, and $\tilde{s}'$ defines a distance between said optical element and said image pickup device along an optical axis of said image pickup device, and a mechanism connected to said processor for changing the spacing between said optical element and said image pickup device to bring said left image and said right image into focus on said image pickup device.

* * * * *